United States Patent [19]

Ueda et al.

[11] Patent Number: 4,555,548
[45] Date of Patent: Nov. 26, 1985

[54] RUBBER COMPOSITION FOR TIRE TREADS

[75] Inventors: Akio Ueda, Yokohama; Shuichi Akita; Takeshi Chida, both of Kamakura, all of Japan

[73] Assignee: Nippon Zeon Co. Ltd., Tokyo, Japan

[21] Appl. No.: 643,420

[22] Filed: Aug. 23, 1984

[51] Int. Cl.$^4$ .......................... C08L 7/00; C08L 9/00; C08L 9/06

[52] U.S. Cl. .................................. 525/237; 525/194; 525/212

[58] Field of Search ............... 525/237, 194, 212, 217, 525/236

[56] References Cited

U.S. PATENT DOCUMENTS

| | | | |
|---|---|---|---|
| 4,224,197 | 9/1980 | Ueda et al. | 525/237 |
| 4,323,485 | 4/1982 | Ahagon et al. | 525/237 |
| 4,373,069 | 2/1983 | Bond et al. | 525/237 |
| 4,485,205 | 11/1984 | Fujimaki et al. | 525/237 |
| 4,510,291 | 4/1985 | Kawakami | 525/237 |
| 4,515,922 | 5/1985 | Sakibara et al. | 525/237 |

Primary Examiner—Allan M. Lieberman
Attorney, Agent, or Firm—Sherman & halloway

[57] ABSTRACT

A rubber composition for tire treads, comprising [I] 10 to 90% by weight of a styrene-butadiene copolymer rubber containing not more than 40% by weight of bound styrene and having bonded to a carbon atom of the rubber molecular chain at least 0.1 mole, per mole of the rubber molecular chain, of an atomic grouping represented by the following formula

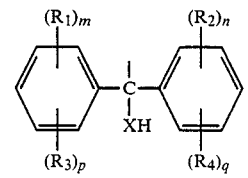

wherein:
X represents O or S,
$R_1$ and $R_2$ are identical or different and each represents an amino group or an alkyl-substituted amino group,
$R_3$ and $R_4$ are identical or different and each represents a substituent other than the above-mentioned,
m, p and q each represent 0 or an integer of at least 1,
n represents an integer of at least 1, $m+p=0-5$, and $n+q=1-5$, and [II] 90 to 10% by weight of at least one rubber selected from the group consisting of styrene-butadiene copolymer rubber having a bound styrene content of not more than 40% by weight and polyisoprene rubber.

7 Claims, No Drawings

RUBBER COMPOSITION FOR TIRE TREADS

This invention relates to a rubber composition for tire treads, which has an improved rebound.

It has recently been strongly desired to reduce the rolling resistance of tires and increase its excellent braking property on a wet road surface, i.e. its wet skid resistance, in order to reduce the fuel cost of automobiles and secure their safety.

Generally, these properties of tires are considered in relation to the dynamic viscoelastic properties of the tread rubber material, and are known to be contradictory properties [see, for example, Transaction of I. R. I., Vol. 40, pages 239–256, 1964].

Reduction of the rolling resistance of tires requires that the tread rubber materials should have a high rebound. In view of the driving condition of an automobile, the rebound should be evaluated at a temperature between about 50° C. and about 70° C. On the other hand, to improve the braking properties of tires on a wet road surface which are important for safety, the tires should have a high wet skid resistance measured by a British Portable skid tester. The tread rubber materials should have large energy losses as frictional resistance which occurs when a tire is allowed to slide over a road surface while applying brake thereto.

Heretofore, to satisfy these two contradictory properties, emulsion-polymerized styrene/butadiene copolymer rubber, high cis-polybutadiene rubber, low cis-polybutadiene rubber, styrene-butadiene rubber obtained by using an organolithium compound catalyst, natural rubber and high cis-isoprene rubber have been used as raw materials either singly or in combination. But these rubbers have not proved to be entirely satisfactory. Specifically, when it is desired to obtain a high rebound, it was necessary to increase the proportion of a rubber having poor wet skid resistance such as low cis-polybutadiene rubber or natural rubber, decrease the amount of a filler such as carbon black, or to increase the amount of a vulcanizing agent such as sulfur. Such a method, however, has the defect that the resulting tire has reduced wet skid resistance or reduced mechanical properties. On the other hand, when it is desired to obtain high wet skid resistance it is necessary to increase the proportion of a rubber having excellent wet skid resistance such as a styrene-butadiene copolymer rubber having a relatively high bound styrene content (for example a bound styrene content of at least 30% by weight) or polybutadiene rubber having a relatively high 1,2-linkage content (for example, a 1,2-linkage content of at least 60%), or increase the amount of a filler such as carbon black or a process oil. This method, however, has the defect of reducing rebounds.

The current practice is to determine the kinds and proportions of starting rubbers so that they maintain practical mechanical properties and harmonize wet skid resistance and rebound within a practically permissible range. It has been thought therefore that the technique of maintaining wet skid resistance and rebound in harmony by combining conventional rubbers has reached its limit.

The present inventors have made extensive investigations in order to eliminate the aforesaid defects, and found surprisingly that a rubber composition comprising as a rubber component a styrene-butadiene copolymer rubber containing not more than 40% by weight of bound styrene and having bonded to a carbon atom of its molecular chain an atomic grouping represented by the general formula

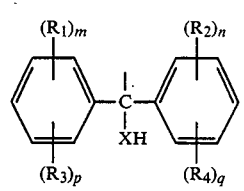

wherein:
X represents O or S,
$R_1$ and $R_2$ are identical or different and each represents an amino group or an alkyl-substituted amino group,
$R_3$ and $R_4$ are identical or different and each represents a substituent other than the above-mentioned, for example, a hydrocarbon group, an alkoxy group or a halogen atom,
m, p and q represents O or an integer of at least 1,
n represents an integer of at least 1, $m+p=0-5$, and $n+p=1-5$, can be greatly improved in rebound without a reduction in wet skid resistance over a rubber composition containing the same polybutadiene rubber which does not contain the aforesaid atomic grouping bonded thereto, and that if necessary while improving the mechanical properties such as abrasion resistance by increasing the amount of a filler such as carbon black, the rebound and the wet skid resistance can be harmonized.

It is an object of this invention to provide a tire tread rubber composition having reduced rolling resistance without adversely affecting its mechanical properties and wet skid resistance.

According to this invention there is provided a tire tread rubber composition comprising [I] 10 to 90% by weight, preferably 30 to 90% by weight, of a styreme-butadiene copolymer rubber containing not more than 40% by weight of bound styrene and having an atomic grouping of the above general formula bonded to a carbon atom of the rubber molecular chain, and [II] 90 to 10% by weight, preferably 70 to 10% by weight, of at least one rubber selected from the group consisting of a styrene-butadiene copolymer rubber having a bound styrene content of not more than 40% by weight and polyisoprene rubber.

The tire tread rubber composition of this invention can give a tire having rolling resistance and wet skid resistance, i.e. braking property on a wet road surface, which are well harmonized at a high level. The composition of this invention can also be used to produce tires which require high rebounds but do not particularly require wet skid resistance.

The styrene-butadiene copolymer rubber having the aforesaid atomic grouping bonded to a carbon atom of the molecular chain (to be referred to as modified SBR) is obtained by reacting a metal-terminated polymer obtained by copolymerizing 1,3-butadiene and styrene in the presence of an alkali metal catalyst or an alkaline earth metal catalyst normally used in solution polymerization, or a styrene-butadiene copolymer rubber having a metal randomly added to the molecular chain by an after-reaction, with a benzophenone or thiobenzophenone described below.

Examples of the benzophenones used in the aforesaid reaction are 4-aminobenzophenone, 4-dimethylaminobenzophenone, 4-dimethylamino-4′-methylbenzophenone, 4,4′-diaminobenzophenone, 4,4′-bis(-dimethylamino)benzophenone, 4,4′-bis(diethylamino)-benzophenone, 4,4′-bis(ethylamino)benzophenone, 3,3′-dimethyl-4,4′-bis(diethylamino)benzophenone, 3,3′-dimethoxy-4,4′-bis(dimethylamino)benzophenone, 3,3′,5,5′-tetraaminobenzophenone, 2,4,6-triaminobenzophenone and 3,3′,5,5′-tetra(diethylamino)benzophenone. Preferred are 4-alkylsubstituted aminobenzophenones and 4,4′-bis(alkylsubstituted amino)benzophenones.

The thiobenzophenones may be those corresponding to the above-exemplified benzophenones.

By the above reaction, the benzophenone or thiobenzophenone is bonded to the terminals of the molecular chain, or both the terminals and other parts of the molecular chain, through a carbon-carbon bond as an atomic grouping represented by the following general formula

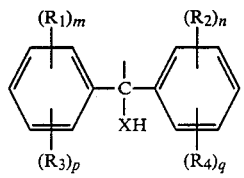

wherein:

X represents O or S, $R_1$ and $R_2$ are identical or different and each represents an amino group or an alkyl-substituted amino group such as an alkylamino or dialkylamino group with the alkyl moiety having about 1 to 10 carbon atoms, $R_3$ and $R_4$ are identical or different and each represents a substituent different from $R_1$ and $R_2$, for example a hydrocarbon group such as an alkyl, alkenyl or cycloalkyl group, an alkoxy group or a halogen atom, m, p and q each represent O or an integer of at least 1, n represents an integer of at least 1, $m+p=0-5$, preferably 0-3, and $n+q=1-5$, preferably 1-3.

The modified SBR used in this invention can be produced, for example, by a method which comprises copolymerizing butadiene and styrene in the presence of a metal-base catalyst and adding the (thio)benzophenone to the rubber solution prior to short-stopping of the polymerization, or a method which comprises adding a metal to a styrene-butadiene copolymer rubber in a solution of the copolymer rubber by addition reaction and thereafter adding the (thio)benzophenone.

The metal-base catalyst used in the polymerization or the addition-reaction includes the monofunctional or multifunctional organometal initiators or the metals themselves wherein the metal is selected from Groups IA and IIA of the periodic table as shown in Kirk-Othmer Encyclopedia of Chemical Technology, Interscience Publishers, Second Edition (1965), Vol. 8, page 94.

The amount of the (thio)benzophenone to be introduced into the modified SBR as the bonded atomic grouping is at least 0.1 mole on an average per mole of the rubber molecular chain. If it is less than 0.1 mole, no improvement in rebound can be obtained. It is preferably at least 0.3 mole, more preferably at least 0.5 mole, especially preferably at least 0.7 mole. If it exceeds 5 moles, the rubbery elasticity will be undesirably lost.

The amount of bound styrene in the modified SBR used in this invention is preferably not more than 40% by weight. If it is more than 40% by weight, an improvement in rebound is small. It should be at least 3% by weight in view of the strength properties of the rubber composition. The 1,2-linkage content of the butadiene units is preferably 10 to 80 mole%. If it exceeds 80 mole%, the abrasion resistance of the composition is undersirably reduced.

The optimum combination of the bound styrene content and the 1,2-linkage content can be determined within the aforesaid ranges so as to satisfy the properties required of tires. Usually, when the amount of bound styrene is large, the 1,2-linkage content is desirably low.

In the tire tread rubber composition of this invention, the proportion of SBR as a first rubber component is 10 to 90% by weight. If it is less than 10% by weight, the effect of improving rebound is small. If it exceeds 90% by weight, the abrasion resistance is undesirably reduced.

The second rubber component is at least one rubber selected from the group consisting of styrene-butadiene copolymer rubber having a bound styrene content of not more than 40% by weight, natural rubber, and synthetic polyisoprene rubber having a cis 1,4-linkage content of at least 90%. The proportion of the second rubber component in the tire tread rubber composition of this invention is 90 to 10% by weight.

There is no particular restriction on the 1,2-linkage content of SBR, but it is usually 10 to 80 mole%.

The abrasion resistance of the rubber composition can be improved by adding a polybutadiene rubber having a 1,2-linkage content of not more than 20%, preferably high-cis polybutadiene rubber. Hence, the conjoint use of high-cis polybutadiene rubber is desirable. The proportion of the third rubber component is 5 to 50 parts by weight per 100 parts by weight of the first and second rubber components combined. If the amount of the third rubber component exceeds the upper limit, the abrasion resistance of the rubber composition is further improved, but its wet skid resistance is undesirably reduced.

All or some of the rubber components used in this invention may be oil-extended rubbers.

Tires can be produced by kneading the rubber composition of this invention with various general compounding chemicals used in the rubber industry, such as sulfur, stearic acid, zinc oxide, various vulcanization accelerators (thiazoles, thiurams and sulfenamides), carbon black of various grades such as HAF and ISAF, reinforcing agents such as silica and calcium carbonate, and process oils, selected depending upon the types of the tires, by means of a mixer such as a roll or a Banbury mixer, molding the rubber compound and vulcanizing it.

Since the rubber composition of this invention has rebound and wet skid resistance harmonized at a high level, it is suitable as a material for automobile tires having improve safety and fuel consumption.

The following examples illustrate the present invention specifically.

PRODUCTION EXAMPLE

This Production Example illustrates the production of some modified SBRs used in the following examples.

[1] A 2-liter stainless steel reactor was washed, dried and purged with dry nitrogen, and then 15 to 40 g of styrene, 185 to 160 g of 1,3-butadiene, 600 g of n-hexane and 1.2 mmoles of n-butyllithium were added. While the contents were stirred, styrene and 1,3-butadiene were polymerized at 45° C. for 30 to 60 minutes. After the polymerization, 4,4'-bis(diethylamino)benzophenone was added in an amount corresponding to 1.5 times its catalytic amount, and the mixture was stirred. Then, the polymer solution in the polymerization reactor was taken into a 1.5% by weight methanol solution of 2,6-di-t-butyl-p-cresol (BHT), and the resulting polymer was coagulated. The polymer was dried under reduced pressure at 60° C. for 24 hours, and its Mooney viscosity was measured [SBR (2), (7)].

The above procedure was repeated except that a thiobenzophenone corresponding to the above benzophenone was used [SBR (7')].

The same procedure as above was repeated except that after the polymerization, the (thio)benzophenone was not added, but the polymer solution was taken out into a methanol solution containing BHT, and the resulting polymer was coagulated. A dry polymer was obtained in the same way as above. [SBR (1), (6)].

[2] SBR (3) produced in [1] above was dissolved in benzene and coagulated by the same operation as in [1] above. This operation was repeated three times to remove the catalyst residue from SBR. The SBR was dried under the same conditions as in [1] above and purified to obtain dry SBR.

To a solution of 100 g of this SBR in 1000 g of dry benzene were added 3.5 mmoles of n-butyllithium and 3.5 mmoles of tetramethylethylenediamine, and the reaction was carried out at 70° C. for 1 hour.

Then, 2.7 mmoles of the same benzophenone compound as used in [1] was added, and reacted for 5 minutes. Then, the polymer was coagulated and dried in the same way as above [SBR (8)].

[3] In the same way as above, a 2-liter stainless steel polymerization reactor was charged with 55 to 90 g of styrene, 110 to 145 g of 1,3-butadiene, 600 g of n-hexane and 1.2 mmoles of n-butyllithium. While the contents were stirred, the polymerization was carried out at 45° to 60° C. for 1 to 2 hours. After the polymerization, the polymer solution was taken into a methanol solution containing BHT and the resulting polymer was coagulated and worked up in the same way as above to obtain a dry polymers [SBR (9), (11), (17)].

Table 1 summarizes the microstructures and Mooney viscosities of the rubbers to be used in the following examples which had been prepared by the above and similar methods and the amounts of the (thio)benzophenones introduced into the rubbers.

The microstructure was measured by an infrared spectroscopic method in a customary manner, and the amount of the (thio)benzophenone introduced was measured by using $^{13}$C-NMR.

TABLE 1

| SBR or Modified SBR | Bound styrene (wt %) | 1,2-linkage content (mol %) | Mooney viscosity (ML$_{1+4}$, 100° C.) | Bonded radical (mole/SBR 1 mole) | Benzophenone compound or Thiobenzophenone compound |
|---|---|---|---|---|---|
| SBR(1) | 6 | 71 | 55 | 0 | |
| SBR(2) | 6 | 71 | 55 | 0.8 | 4,4'-bis(diethylamino)benzophenone |
| SBR(3) | 16 | 40 | 44 | 0 | |
| SBR(4) | 16 | 40 | 44 | 0.8 | 4,4'-diaminobenzophenone |
| SBR(4') | 16 | 40 | 44 | 0.8 | 4,4'-diaminothiobenzophenone |
| SBR(5) | 19 | 60 | 50 | 0 | |
| SBR(6) | 19 | 60 | 50 | 0.8 | 4,4'-bis(dimethylamino)benzophenone |
| SBR(6') | 19 | 60 | 50 | 0.8 | 4,4'-bis(dimethylamino)thiobenzophenone |
| SBR(7) | 19 | 60 | 54 | 1.3 (*) | 4,4'-bis(dimethylamino)benzophenone |
| SBR(8) | 25 | 19 | 53 | 0 | |
| SBR(9) | 25 | 19 | 53 | 0.6 | 3,3'-dimethyl-4,4'-bis(diethylamino)benzophenone |
| SBR(9') | 25 | 19 | 53 | 0.6 | Corresponding thiobenzophenone |
| SBR(10) | 24 | 42 | 60 | 0 | |
| SBR(11) | 24 | 42 | 60 | 0.6 | 4,4'-bis(diethylamino)benzophenone |
| SBR(12) | 24 | 42 | 64 | 1.3 (*) | " |
| SBR(13) | 33 | 39 | 56 | 0 | |
| SBR(14) | 33 | 39 | 56 | 0.6 | " |
| SBR(14') | 33 | 39 | 56 | 0.6 | Corresponding thiobenzophenone |
| SBR(15) | 33 | 39 | 60 | 1.3 (*) | 4,4'-bis(diethylamino)benzophenone |
| SBR(16) | 37 | 19 | 43 | 0 | |
| SBR(17) | 37 | 19 | 43 | 0.6 | " |
| SBR(17') | 37 | 19 | 43 | 0.6 | Corresponding thiobenzophenone |

(*) Shows that the radical was randomly bonded to the molecular chain. Otherwise, the radical was bonded to the chain end.

EXAMPLE 1

Each of the rubber compositions was kneaded with the various compounding chemicals shown in Table 2 in a 250 ml. Brabender-type mixer to obtain a rubber compound. Sulfur and the vulcanization accelerator were used in such amounts that would give an optimally vulcanized rubber composition. The rubber compound was press-cured at 160° C. for 15 to 30 minutes to form test samples.

TABLE 2

| Compounding recipe | |
|---|---|
| Ingredients | Amounts (parts by weight) |
| Rubber (see Table 3) | 100 |
| HAF carbon black | 50 |
| Aromatic process oil | 5 |
| ZnO, No. 3 | 3 |
| Stearic acid | 2 |
| Sulfur Vulcanization accelerator (N—cyclohexyl-2-benzothiazyl sulfenamide) | Variable amounts (Table 3) |

The strength properties were measured in accordance with JIS K-6301. The rebound was measured at a temperature of 55° C. by using a Dunlop tripsometer. The wet skid resistance was measured by a portable skid tester (made by Stanley Company, England) at 23° C. on a road surface in accordance with ASTM E-303-74 (made by 3M; type B for outdoor use, a black safety walk), and expressed by an index calculated from the following formula.

$$\frac{\text{Wet skid resistance value of the vulcanizate}}{\text{Wet skid resistance value of the vulcanizate of E-SBR-1502}} \times 100$$

The Pico abrasion was measured by a Goodrich-type Pico abrasion tester in accordance with ASTM D-2228, and expressed by an index calculated from the following formula.

$$\frac{\text{Amount of abrasion of the vulcanizate of E-SBR-1502}}{\text{Amount of abrasion of the vulcanizate of the rubber composition}} \times 100$$

The results are shown in Table 3.

TABLE 3

|  | Comparison | | | | Invention | | | |
|---|---|---|---|---|---|---|---|---|
|  | Run No. | | | | | | | |
|  | 1 | 2 | 3 | 4 | 5 | 6 | 7 | 8 |
| Rubber components | | | | | | | | |
| E-SBR | 100 | | | | | | | |
| SBR(1) |  | 70 |  | 60 |  |  |  |  |
| SBR(2) |  |  |  |  | 70 |  |  | 60 |
| SBR(3) |  |  |  |  |  |  |  |  |
| SBR(4) |  |  |  |  |  |  |  |  |
| SBR(5) |  |  | 60 |  |  |  |  |  |
| SBR(6) |  |  |  |  |  | 60 | 60 |  |
| SBR(8) |  | 30 |  |  | 30 |  |  |  |
| SBR(10) |  |  | 40 | 30 |  | 40 | 25 | 30 |
| SBR(13) |  |  |  |  |  |  |  |  |
| cis BR |  |  |  | 10 |  |  | 15 | 10 |
| Sulfur | 1.8 | 1.8 | 1.8 | 1.77 | 1.8 | 1.8 | 1.77 | 1.77 |
| Accelerator | 1.2 | 1.2 | 1.2 | 1.19 | 1.2 | 1.2 | 1.19 | 1.19 |
| Properties of vulcanizates | | | | | | | | |
| Rebound (%) | 55 | 60 | 58 | 59 | 65 | 62 | 62 | 64 |
| Wet skid resistance (*) | 100 | 107 | 110 | 106 | 107 | 110 | 103 | 106 |
| Pico abrasion (**) | 100 | 75 | 75 | 86 | 76 | 79 | 100 | 89 |
| Tensile strength (kg/cm$^2$) | 278 | 220 | 230 | 210 | 223 | 235 | 210 | 218 |
| Elongation (%) | 490 | 440 | 460 | 450 | 420 | 430 | 420 | 420 |
| 300% Modulus (kg/cm$^2$) | 140 | 125 | 130 | 122 | 131 | 138 | 131 | 130 |

|  | Comparison | | | | Invention | | | | |
|---|---|---|---|---|---|---|---|---|---|
|  | Run No. | | | | | | | | |
|  | 9 | 10 | 11 | 12 | 13 | 14 | 15 | 16 | 17 |
| Rubber components | | | | | | | | | |
| E-SBR | | | | | | | | | |
| SBR(1) | | | | | | | | | |
| SBR(2) | | | | | | | | | |
| SBR(3) | 70 | 50 | 40 | 30 | | | | | |
| SBR(4) | | | | | 80 | 50 | 40 | 30 | 40 |
| SBR(5) | | | | | | | | | |
| SBR(6) | | | | | | | | | |
| SBR(8) | | 50 | | | | 50 | | | |
| SBR(10) | | | | | | | | | |
| SBR(13) | 30 | | 40 | 20 | 10 | | 30 | 40 | 40 |
| cis BR | | | 20 | 50 | 10 | | 30 | 30 | 20 |
| Sulfur | 1.8 | 1.8 | 1.74 | 1.65 | 1.77 | 1.8 | 1.71 | 1.71 | 1.74 |
| Accelerator | 1.2 | 1.2 | 1.18 | 1.15 | 1.19 | 1.2 | 1.17 | 1.17 | 1.18 |
| Properties of vulcanizates | | | | | | | | | |
| Rebound (%) | 60 | 61 | 60 | 60 | 65 | 66 | 63 | 63 | 64 |
| Wet skid resistance (*) | 102 | 102 | 101 | 90 | 101 | 102 | 100 | 102 | 101 |
| Pico abrasion (**) | 79 | 85 | 102 | 151 | 87 | 88 | 120 | 120 | 105 |
| Tensile strength (kg/cm$^2$) | 240 | 243 | 230 | 210 | 39 | 243 | 230 | 226 | 236 |
| Elongation (%) | 470 | 480 | 460 | 460 | 440 | 460 | 450 | 460 | 450 |
| 300% Modulus (kg/cm$^2$) | 135 | 131 | 128 | 112 | 140 | 136 | 127 | 125 | 131 |

|  | Comparison | | | | | Invention | | | | | | | |
|---|---|---|---|---|---|---|---|---|---|---|---|---|---|
|  | Run No. | | | | | | | | | | | | |
|  | 18 | 19 | 20 | 21 | 22 | 23 | 24 | 25 | 26 | 27 | 28 | 29 | 30 |
| Rubber components | | | | | | | | | | | | | |
| SBR(1) | 40 |  | 20 | 20 |  | 40 |  | 20 |  | 20 |  | 40 |  |
| SBR(5) |  | 30 |  |  | 20 |  | 30 |  | 20 |  | 20 |  | 20 |
| SBR(8) | 50 | 60 |  |  |  |  |  |  |  |  |  |  |  |
| SBR(9) |  |  |  |  |  | 50 | 60 |  |  |  |  |  |  |
| SBR(9') |  |  |  |  |  |  |  |  |  |  |  | 50 |  |
| SBR(10) |  |  | 70 |  |  |  |  |  |  |  |  |  |  |
| SBR(11) |  |  |  |  |  |  |  | 70 | 60 |  |  |  |  |
| SBR(12) |  |  |  |  |  |  |  |  |  |  |  |  | 60 |
| SBR(16) |  |  |  | 60 | 70 |  |  |  |  |  |  |  |  |
| SBR(17) |  |  |  |  |  |  |  |  |  | 60 | 70 |  |  |
| cis BR | 10 | 10 | 10 | 20 | 10 | 10 | 10 | 10 | 20 | 20 | 10 | 10 | 20 |
| Sulfur | 1.77 | 1.77 | 1.77 | 1.74 | 1.77 | 1.77 | 1.77 | 1.77 | 1.74 | 1.74 | 1.77 | 1.77 | 1.74 |
| Accelerator | 1.19 | 1.19 | 1.19 | 1.18 | 1.19 | 1.19 | 1.19 | 1.19 | 1.18 | 1.18 | 1.19 | 1.19 | 1.18 |

TABLE 3-continued

| Properties of vulcanizates | | | | | | | | | | | | | |
|---|---|---|---|---|---|---|---|---|---|---|---|---|---|
| Rebound (%) | 61 | 60 | 59 | 59 | 58 | 64 | 64 | 64 | 63 | 63 | 63 | 64 | 63 |
| Wet skid resistance (*) | 102 | 101 | 107 | 102 | 106 | 102 | 101 | 107 | 103 | 102 | 106 | 102 | 103 |
| Pico abrasion (**) | 99 | 104 | 86 | 100 | 91 | 99 | 105 | 89 | 104 | 103 | 91 | 99 | 100 |
| Tensile strength (kg/cm$^2$) | 223 | 230 | 220 | 226 | 240 | 230 | 235 | 225 | 229 | 239 | 239 | 226 | 210 |
| Elongation (%) | 460 | 470 | 470 | 440 | 440 | 430 | 440 | 450 | 430 | 420 | 410 | 430 | 410 |
| 300% Modulus (kg/cm$^2$) | 122 | 125 | 124 | 130 | 136 | 130 | 133 | 129 | 131 | 140 | 144 | 128 | 140 |

(*) and (**) are expressed by indices.

EXAMPLE 2

In the same way as in Example 1 except that the rubber compositions indicated in Table 4 were used, rubber compositions were prepared and vulcanized, and the properties of the vulcanizates were evaluated. The results are shown in Table 4.

EXAMPLE 3

In the same way as in Example 1 except that the rubber components indicated in Table 5 were used, rubber compositions were prepared and vulcanized, and the properties of the vulcanizates were evaluated. The results are shown in Table 5.

TABLE 4

| | Comparison | | | | Invention | | | | | |
|---|---|---|---|---|---|---|---|---|---|---|
| | | | | | Run No. | | | | | |
| | 1 E-SBR | 2 SBR(1) | 3 SBR(5) | 4 SBR(5) | 5 SBR(2) | 6 SBR(6) | 7 SBR(6) | 8 SBR(2) | 9 SBR(6') | 10 SBR(7) |
| SBR | 100 | 50 | 40 | 60 | 50 | 40 | 60 | 80 | 60 | 40 |
| NR(RSSNo3) (*) | | 40 | 50 | 40 | 40 | 50 | 40 | 10 | 40 | 50 |
| cis BR | | 10 | 10 | — | 10 | 10 | — | 10 | — | 10 |
| Sulfur | 1.80 | 1.85 | 1.87 | 1.88 | 1.85 | 1.87 | 1.88 | 1.79 | 1.88 | 1.87 |
| Accelerator | 1.20 | 1.03 | 0.99 | 1.04 | 1.03 | 0.99 | 1.04 | 1.15 | 1.04 | 0.99 |
| Properties of vulcanizates | | | | | | | | | | |
| Rebound (%) | 55 | 61 | 60 | 59 | 65 | 63 | 63 | 66 | 63 | 63 |
| Wet skid resistance index | 100 | 100 | 100 | 104 | 100 | 100 | 104 | 105 | 104 | 100 |
| Pico abrasion index | 100 | 90 | 97 | 81 | 90 | 98 | 82 | 82 | 79 | 92 |
| Tensile strength (kg/cm$^2$) | 278 | 250 | 260 | 253 | 253 | 265 | 255 | 228 | 255 | 250 |
| Elongation (%) | 490 | 490 | 505 | 490 | 480 | 490 | 470 | 420 | 470 | 470 |
| 300% Modulus (kg/cm$^2$) | 140 | 120 | 123 | 130 | 125 | 127 | 134 | 125 | 133 | 132 |

| | Comparison | | | | | Invention | | | | | | |
|---|---|---|---|---|---|---|---|---|---|---|---|---|
| | | | | | | Run No. | | | | | | |
| | 11 SBR(10) | 12 SBR(10) | 13 SBR(16) | 14 SBR(13) | 15 SBR(13) | 16 SBR(11) | 17 SBR(11) | 18 SBR(17) | 19 SBR(14) | 20 SBR(14) | 21 SBR(14') | 22 SBR(15) |
| SBR | 60 | 70 | 50 | 40 | 60 | 60 | 70 | 50 | 40 | 60 | 40 | 40 |
| NR(RSSNo3) (*) | 40 | 20 | 30 | 40 | 30 | 40 | 20 | 30 | 40 | 30 | 40 | 40 |
| cis BR | — | 10 | 20 | 20 | 10 | — | 10 | 20 | 20 | 10 | 20 | 20 |
| Sulfur | 1.88 | 1.81 | 1.80 | 1.82 | 1.83 | 1.88 | 1.81 | 1.80 | 1.82 | 1.83 | 1.82 | 1.82 |
| Accelerator | 1.04 | 1.11 | 1.06 | 1.04 | 1.07 | 1.04 | 1.11 | 1.06 | 1.04 | 1.07 | 1.04 | 1.04 |
| Properties of vulcanizates | | | | | | | | | | | | |
| Rebound (%) | 61 | 60 | 61 | 60 | 61 | 65 | 65 | 64 | 64 | 65 | 64 | 64 |
| Wet skid resistance index | 104 | 103 | 100 | 100 | 105 | 104 | 103 | 100 | 100 | 105 | 100 | 100 |
| Pico abrasion index | 78 | 90 | 113 | 108 | 86 | 77 | 89 | 113 | 108 | 87 | 107 | 103 |
| Tensile strength (kg/cm$^2$) | 258 | 243 | 248 | 260 | 264 | 258 | 240 | 245 | 258 | 262 | 250 | 245 |
| Elongation (%) | 510 | 490 | 480 | 490 | 485 | 500 | 480 | 460 | 485 | 470 | 480 | 470 |
| 300% Modulus (kg/cm$^2$) | 110 | 125 | 128 | 125 | 133 | 112 | 128 | 132 | 128 | 138 | 130 | 135 |

(*) Natural rubber

TABLE 5

| | Comparison | | | | | | Invention | | | | | | | |
|---|---|---|---|---|---|---|---|---|---|---|---|---|---|---|
| | | | | | | | Run No. | | | | | | | |
| | 1 | 2 | 3 | 4 | 5 | 6 | 7 | 8 | 9 | 10 | 11 | 12 | 13 | 14 |
| Rubber components | | | | | | | | | | | | | | |
| E-SBR | 100 | | | | | | | | | | | | | |
| SBR(1) | | 50 | 40 | 50 | | | | | | | | | | |
| SBR(2) | | | | | | | 50 | 40 | 50 | | | | | |
| SBR(3) | | | | | 50 | 50 | | | | | | | | |
| SBR(4) | | | | | | | | | | 50 | | 50 | 80 | 30 |
| SBR(4') | | | | | | | | | | | 50 | | | |
| SBR(8) | | 20 | | | 30 | | 20 | | | 30 | 30 | | 10 | 35 |
| SBR(10) | | | 20 | | | | | 20 | | | | | | |
| SBR(13) | | | | | | 20 | | | | | | 20 | | |

TABLE 5-continued

|  | \> | \> | \> | \> | \> | \> | \> | \> | \> | \> | \> | \> | \> | \> |
|---|---|---|---|---|---|---|---|---|---|---|---|---|---|---|
| SBR(16) |  |  |  |  | 30 |  |  |  |  | 30 |  |  |  |  |
| cis BR |  | 30 | 40 | 20 | 30 | 30 | 30 | 40 | 20 | 20 | 20 | 30 | 10 | 35 |
| Sulfur | 1.8 | 1.86 | 1.88 | 1.84 | 1.84 | 1.84 | 1.86 | 1.88 | 1.84 | 1.84 | 1.84 | 1.84 | 1.82 | 1.87 |
| Accelerator | 1.2 | 1.08 | 1.04 | 1.12 | 1.12 | 1.12 | 1.08 | 1.04 | 1.12 | 1.12 | 1.12 | 1.12 | 1.16 | 1.06 |
| Properties of vulcanizates |  |  |  |  |  |  |  |  |  |  |  |  |  |  |
| Rebound (%) | 55 | 61 | 61 | 60 | 61 | 60 | 65 | 64 | 64 | 65 | 66 | 64 | 65 | 64 |
| Wet skid resistance (*) | 100 | 105 | 105 | 107 | 101 | 103 | 105 | 105 | 107 | 101 | 101 | 103 | 102 | 100 |
| Pico abrasion (**) | 100 | 78 | 74 | 72 | 85 | 73 | 78 | 73 | 72 | 87 | 85 | 74 | 75 | 85 |
| Tensile strength (kg/cm$^2$) | 278 | 238 | 244 | 236 | 248 | 251 | 242 | 248 | 240 | 253 | 250 | 250 | 248 | 262 |
| Elongation (%) | 490 | 470 | 480 | 450 | 490 | 490 | 460 | 470 | 435 | 480 | 470 | 460 | 450 | 490 |
| 300% Modulus (kg/cm$^2$) | 140 | 125 | 127 | 132 | 133 | 133 | 128 | 130 | 135 | 139 | 138 | 137 | 143 | 133 |

|  | Comparison ||||||| Invention |||||||
|---|---|---|---|---|---|---|---|---|---|---|---|---|---|---|
|  | \> | \> | \> | \> | \> | \> | Run No. | \> | \> | \> | \> | \> | \> | \> |
|  | 15 | 16 | 17 | 18 | 19 | 20 | 21 | 22 | 23 | 24 | 25 | 26 | 27 | 28 |
| Rubber components |  |  |  |  |  |  |  |  |  |  |  |  |  |  |
| SBR(1) |  |  |  | 30 | 10 | 20 |  |  |  | 30 | 10 | 20 | 20 |  |
| SBR(5) | 60 | 30 | 60 |  |  |  |  |  |  |  |  |  |  | 30 |
| SBR(6) |  |  |  |  |  |  | 60 | 60 |  |  |  |  |  |  |
| SBR(7) |  |  |  |  |  |  |  |  | 60 |  |  |  |  |  |
| SBR(8) | 30 | 50 |  | 60 |  |  | 30 | 30 |  |  |  |  |  |  |
| SBR(9) |  |  |  |  |  |  |  |  |  | 60 |  |  |  | 50 |
| SBR(10) |  |  | 10 |  | 60 |  | 10 |  |  |  |  |  |  |  |
| SBR(11) |  |  |  |  |  |  |  |  |  |  | 60 |  |  |  |
| SBR(16) |  |  |  |  |  | 40 |  |  |  |  |  |  |  |  |
| SBR(17) |  |  |  |  |  |  |  |  |  |  |  | 40 |  |  |
| SBR(17') |  |  |  |  |  |  |  |  |  |  |  |  | 40 |  |
| cis BR | 10 | 20 | 30 | 10 | 30 | 40 | 10 | 30 | 10 | 10 | 30 | 40 | 40 | 20 |
| Sulfur | 1.82 | 1.84 | 1.84 | 1.84 | 1.84 | 1.84 | 1.84 | 1.84 | 1.84 | 1.84 | 1.84 | 1.84 | 1.84 | 1.84 |
| Accelerator | 1.16 | 1.14 | 1.14 | 1.14 | 1.14 | 1.14 | 1.14 | 1.14 | 1.14 | 1.14 | 1.14 | 1.14 | 1.14 | 1.14 |
| Properties of vulcanizates |  |  |  |  |  |  |  |  |  |  |  |  |  |  |
| Rebound (%) | 59 | 60 | 58 | 61 | 61 | 60 | 63 | 63 | 63 | 66 | 65 | 63 | 63 | 64 |
| Wet skid resistance (*) | 106 | 101 | 106 | 103 | 106 | 104 | 106 | 106 | 106 | 103 | 106 | 104 | 104 | 101 |
| Pico abrasion (**) | 82 | 88 | 80 | 85 | 75 | 78 | 83 | 80 | 80 | 86 | 75 | 78 | 74 | 87 |
| Tensile strength (kg/cm$^2$) | 240 | 252 | 247 | 240 | 250 | 260 | 242 | 250 | 230 | 232 | 248 | 252 | 248 | 245 |
| Elongation (%) | 470 | 490 | 480 | 480 | 500 | 490 | 450 | 460 | 430 | 450 | 490 | 460 | 450 | 470 |
| 300% Modulus (kg/cm$^2$) | 129 | 126 | 128 | 125 | 119 | 133 | 133 | 133 | 140 | 132 | 122 | 137 | 139 | 130 |

(*) Index
(**) Index

What we claim is:

1. A rubber composition for tire treads, said composition comprising
   (I) 10 to 90% by weight of a styrene-butadiene copolymer rubber containing not more than 40% by weigtht of bound styrene and having bonded to a carbon atom of the rubber molecular chain at least 0.1 mole and up to 5 moles, per mole of the rubber molecular chain, of an atomic grouping represented by the following formula

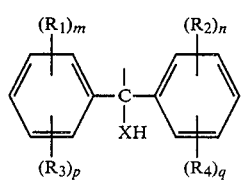

wherein:
   X represents O or S,
   $R_1$ and $R_2$ are identical or different and each represents an amino group or an alkyl-substituted amino group,
   $R_3$ and $R_4$ are identical or different and each represents a substituent other than an amino group or alkyl-substituted amino group,
   m, p and q represent O or an integer of at least 1,
   n represents an integer of at least 1, m+p=0−5 and n+q=1−5, and
   (II) 90 to 10% by weight of at least one rubber selected from the group consisting of styrene-butadiene copolymer rubber having a bonded styrene content of not more than 40% by weight, natural rubber and synthetic polyisoprene rubber having a cis 1,4-linkage content of at least 90%.

2. The composition of claim 1 comprising 30 to 90% by weight of the styrene-butadiene copolymer rubber [I] and 70 to 10% by weight of the rubber [II].

3. The composition of claim 1 which further comprises (III) 5 to 50 parts by weight per 100 parts by weight of the rubbers (I) and (II) combined of a polybutadiene rubber having a 1,2-linkage content of not more than 20%.

4. The composition of claim 1 wherein $R_3$ and $R_4$ are the same or different and each represents a hydrocarbon group, an alkoxy group or a halogen atom.

5. The composition of claim 1 wherein the atomic grouping represented by the formula is derived from a benzophenone or thiobenzophenone compound selected from the group consisting of 4-aminobenzophenone, 4-dimethylaminobenzophenone, 4-dimethylamino-4'-methylbenzophenone, 4,4'-diaminobenzophenone, 4,4'-bis(dimethylamino)benzophenone, 4,4'-bis(diethylamino)benzophenone, 4,4'-bis(ethylamino)benzophenone, 3,3'-dimethyl-4,4'-bis(diethylamino)benzophenone, 3,3'-dimethoxy-4,4'-bis(dimethylamino)benzophenone, 3,3',5,5'-tetraaminobenzophenone, 2,4,6-triaminobenzophenone, 3,3',5,5'-tetra(diethylamino)benzophenone and the corresponding thiobenzophenones.

6. The composition of claim 5 wherein at least 0.3 mole of the atomic grouping is bonded to a carbon atom of the rubber molecular chain.

7. The composition of claim 1 wherein the styrene-butadiene copolymer rubber of component (I) has at least 3 percent by weight of bound styrene and the 1,2 linkage content of butadiene units thereof is from 10 to 80 mole%.

* * * * *